July 18, 1961  J. W. HARRISON  2,992,457
METHOD OF JOINING PIPE AND TUBING
Filed March 28, 1960

United States Patent Office 2,992,457
Patented July 18, 1961

2,992,457
METHOD OF JOINING PIPE AND TUBING
John W. Harrison, Winchester, Mass., assignor to W. R. Grace & Co., Cambridge, Mass., a corporation of Connecticut
Filed Mar. 28, 1960, Ser. No. 17,944
6 Claims. (Cl. 18—59)

This invention relates to a method for joining pipe and is particularly adapted to tapered joint pipes characteristic of fiber-asphalt and asbestos-cement sewer and water lines and to sheet metal pipe joints used in heating and ventilating apparatus.

The objects of the invention are to join pipes quickly and cheaply; to avoid the fitting of gaskets or the tamping in of gasketing material; to produce a tight lock between the mating members which, at the same time, functions as a gasket; and to produce air tight, rattle-free joints in heating and ventilating ducts.

The invention depends upon the fact that biaxially oriented polymers such as polyethylene and polypropylene shrink very materially when heated. I have found further that if the pipe is provided with a packing space into which a skirt of the polymer can retract when proper heat is applied, the polymer will retract into the space and fill it. The invention will become obvious from the description and from the drawings in which FIGURE 1 is an exploded sectional view through the pipe and coupling showing the parts before assembling.

Figure 1:
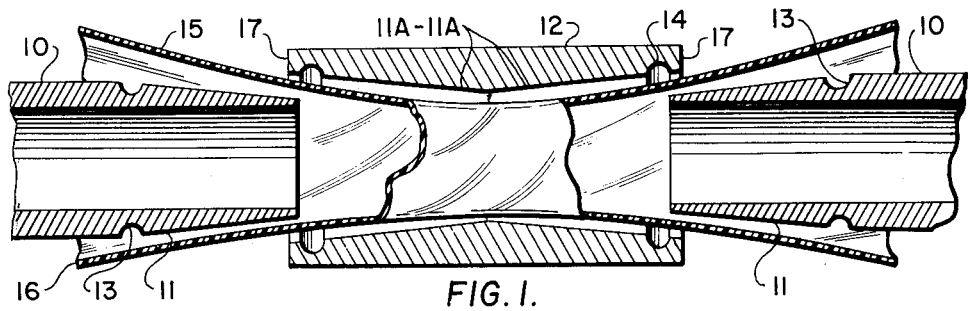

Referring to FIGURE 1, the parts 10 represent two abutting lengths of fiber or asbestos-cement pipe. The end portion of each pipe terminates in the freezing taper 11. Pipe coupling 12 carries 2 opposed tapers 11A—11A of the same freezing angle. Immediately behind the tapered portion of each pipe, I cut an inwardly directed circumferential channel or groove 13; in the coupling 12 I form an outwardly directed groove 14.

Figure 2:
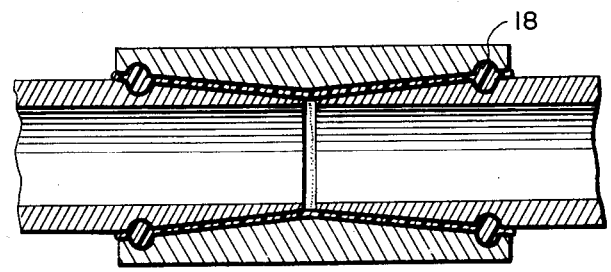
FIGURE 2 is a sectional view through the pipe and coupling showing the completed joint.
Figure 3:
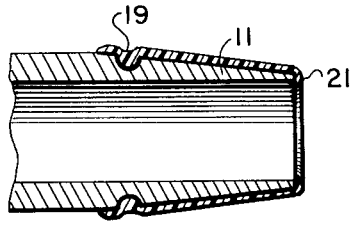
FIGURE 3 is a sectional view through the end of a pipe showing the pipe provided with an extra sleeve.

A tubular sleeve 15 made of a film of biaxially stretched polyolefin, preferably slightly cross-linked polyethylene or polypropylene, is placed inside the coupling 12. Sleeve 15 is made long enough so that a substantial skirt 16 extends beyond both ends of the coupling 12. In assembly, the pipes are drawn together, first spreading the skirts 16 over the tapered pipe ends 11. The pipes 10 are forced towards each other until they home in the tapers with the grooves 14 in the coupling overlying the grooves 13 in the pipe (see FIGURE 2).

A hot air torch which can deliver air at about 500° F. is then played on the skirt 16—16, then the air is directed against the ends 17 of the coupling 12. During this operation the skirts 16 shrink and withdraw almost completely into the combined groove 13—14 which now presents an approximately circular cross section. Consequently the groove 13—14 becomes full of an impervious plastic which forms a complete ring seal 18. Not only does this seal make a water-tight and root-proof joint, but the rugged seal locks the pipe against lateral displacement.

Sleeves of from .002 to .005 of an inch in thickness (depending upon the size of the pipe) usually offer sufficient bulk, but when more sealing bulk is necessary, it may be provided by first shrinking separate collars 19 of oriented polymer onto the ends of each pipe. The collars 19 should be placed so that a small skirt projects beyond the end of the pipe. Shrinking this skirt portion and also a small zone of the polymer at the end of the pipe causes the skirt to overlap the end of the pipe and to provide an anchorage 21. Then the torch is moved backwards along the pipe shrinking the collar progressively along taper 11. Since the collar is now anchored at 21 the skirt shrinks into the groove 13. Both of the pipes 10 are treated in this manner. The coupling 12 is lined with sleeve 15 as before and the joining operation proceeds as is set forth in the description of FIGURE 1. The material already occupying a considerable part of the groove 13 together with the material which is derived from the skirt 15 is sufficient to provide a bulky tight fitting sealing ring.

Figure 4:
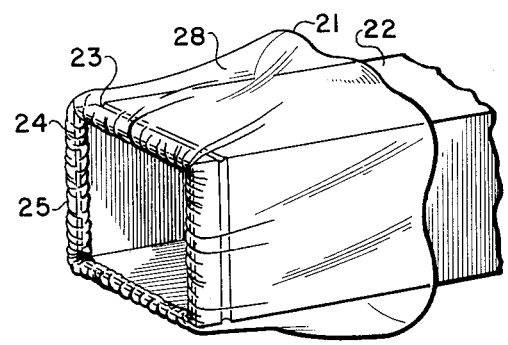
FIGURE 4 is an elevation of a sheet metal pipe showing the skirt in place.
Figure 5:
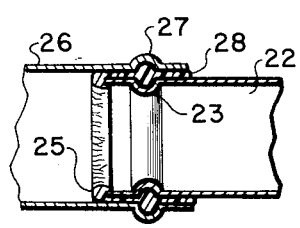
FIGURE 5 is a sectional view showing a completed sheet metal pipe joint.

In joining sheet metal pipes, an operation which is illustrated in FIGURES 4 and 5, sleeve 21 of oriented polymer is slipped over the end of the interior pipe 22. This pipe is roll grooved at 23 adjacent its ends. Quite a small skirt of film is left protruding beyond the end of the pipe. The air torch is then played on the skirt and run around the extreme end 24 of the pipe. Due to the shrinkage of the polymer when heated, this small skirt disappears and forms a small bead 25 hooked over the end of the sheet metal. The outer pipe 26 which is outwardly roll grooved at 27 is then slipped over the jacketed inner pipe 22. When the pipes are finally in position outwardly directed groove 27 should overlie the inwardly directed groove 23 in the pipe 22.

The skirt 28 of material which extends beyond outer pipe 26 and the pipe area adjacent the bead are then heated with the air torch. Skirt 28 shrinks and pulls into the recess formed by grooves 23 and 27 where the shrunk polymer forms an effective gasket. In addition to the tightness of the joint, an unforeseen advantage is that vibration, such as from a fan sometimes telegraphed along the pipe, is materially damped.

In sheet metal pipes, the grooves do not have to face in opposite directions. Both grooves may face in the same direction (either outward or inward) provided a space is left between the walls of the respective grooves which can be filled with the shrunken skirt.

As can be seen from the description, the film must shrink radially inwardly in order to hug the pipe and it must also be able to shrink longitudinally to a very high degree. Preferably the heat shrinkable material which is employed in the present invention is biaxially oriented polyethylene having a shrink energy of 250 p.s.i. at 96° C. High, medium, or low density polyethylene prepared by low or by high pressure techniques may be used as the starting material and the polyethylene can have a weight of 7,000; 12,000; 19,000; 21,000; 24,000 or 35,000 or even higher.

In general, the polyethylene employed in the present invention is a film or tubing which has been irradiated to an extent of 2 to 100 megarads, preferably 6 to 20 megarads. The irradiation can be accomplished in a conventional fashion, e.g. by the use of a high voltage resonant transformer such as the 2 million volt General Electric resonant transformer or by high energy particle accelerators of 50 to 50 million volts or a Van de Graf electron generator. In addition to the use of electrons, there can be employed beta rays, gamma rays, e.g. by employing cobalt 60 and so forth. Procedures such as are disclosed in the Baird application, Serial No. 713,848 filed February 7, 1958 or in Rainer Patent 2,877,500 make particularly suitable material.

The biaxial orientation is normally carried out to an extent of 100 to 700% longitudinally and 100 to 900% laterally. Biaxial stretching can be carried out by blowing irradiated polyethylene as disclosed in the Baird application. The irradiated biaxially oriented polyethylene prepared by such a procedure has a high shrink energy, e.g. 100 to 500 p.s.i. at 96° C.

In place of irradiated polyethylene there can be employed similarly irradiated polypropylene or polypropylene which has not been irradiated.

The materials described above shrink almost instantly when they are heated. They form excellent impervious seals when used in the process of this invention. The thickness of the film which is required varies with the diameter of the pipe and the cross section of the sealing ring which it is desired to form. I have found that the film in the form of tubing from .002 to .005 of an inch thick covers most demands. The simplicity and effectiveness of this pipe joining operation greatly expedites work in cramped and inconvenient locations such as are often found in basements or at the bottom of a ditch.

In the following claims it is intended that the word "pipe" shall include a pipe coupling.

1. The method of joining pipes having interfitted joint areas which includes forming an outwardly directed groove in the inner periphery of the outer pipe, forming a companion groove in the outer periphery of the inner pipe, completely lining the joint area by placing a sleeve of shrinkable biaxially oriented polymeric substance between the pipes, said sleeve having a greater length than the joint area to leave a freely extending skirt, homing the pipes until the grooves overlie to form a hollow recess, then heating the skirt sufficiently to cause the skirt to withdraw into the recess and thereby form a seal.

2. The method of forming a ring-seal in the joint areas of interfitted pipes which includes forming a continuous groove in the joint areas of each pipe, providing a sleeve formed of a biaxially oriented polymeric substance having a length materially exceeding that of the joint area of the pipes, completely covering the joint area of at least the interior pipe with the sleeve, arranging the sleeve about the pipe to leave a freely extending skirt beyond the joint area, interfitting the pipes until the grooves overlie, and then heating the exposed skirt to cause it to contract and fill the space between the walls of the overlying grooves, thereby forming a ring-seal.

3. The method of joining pipes according to claim 2 in which the biaxially oriented polymeric substance is irradiated biaxially oriented polyethylene having a shrink energy lying between 100 and 500 p.s.i. at 96° C.

4. The method of joining pipes according to claim 2 in which the biaxially oriented polymeric substance is polypropylene.

5. Method of joining tapered end pipes in a pipe coupling having mating tapers, which comprises forming companion grooves exteriorly on the pipe and interiorly in the coupling, drawing a sleeve of a biaxially oriented polymeric substance having a length much longer than the coupling through said coupling and extending the sleeve exteriorly over the pipes as a skirt, homing the pipes in the coupling until the grooves overlie thereby securing that portion of the sleeve in the tapers against motion, and then heating the extended skirts to cause the skirts to withdraw into the recess and thereby form a ring seal.

6. The method of joining tapered-end pipes in a pipe coupling having mating tapers which comprises forming companion grooves exteriorly on the pipe and interiorly in the coupling, covering the tapered ends of the pipes and the pipe grooves with a sleeve of a biaxially oriented polymeric substance, shrinking the sleeve tightly about the taper and the groove by applying heat to the sleeve to form a tight-fitting jacket, drawing a second sleeve of a biaxially oriented polymeric substance having a length materially in excess of that of the coupling through the coupling and extending said second sleeve exteriorly over the pipes as a skirt, homing the pipes in the coupling until the oppositely facing grooves overlie, and then heating the extended skirts sufficiently to cause the skirts to contract and to fill the grooved space between the pipes and the coupling, thereby joining the pipes and forming a ring-seal.

References Cited in the file of this patent

UNITED STATES PATENTS

| 825,116 | Engels | July 3, 1906 |
| 1,979,470 | Johnston | Nov. 6, 1924 |
| 2,646,822 | Ferguson | July 28, 1953 |

FOREIGN PATENTS

| 484,849 | Canada | July 15, 1952 |